US008950952B2

(12) United States Patent
Pfnuer et al.

(10) Patent No.: US 8,950,952 B2
(45) Date of Patent: Feb. 10, 2015

(54) CONSTRAINING BALL LENS IN AN OPTICAL SUBASSEMBLY

(75) Inventors: Stefan M. Pfnuer, Redwood City, CA (US); Tat Ming Teo, Singapore (SG); Songyang Li, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 1296 days.

(21) Appl. No.: 12/708,219

(22) Filed: Feb. 18, 2010

(65) Prior Publication Data

US 2011/0200287 A1    Aug. 18, 2011

(51) Int. Cl.
*G02B 6/36* (2006.01)
*G02B 6/42* (2006.01)

(52) U.S. Cl.
CPC ............ *G02B 6/4204* (2013.01); *G02B 6/4231* (2013.01); *G02B 6/4239* (2013.01)
USPC .......................................................... 385/93

(58) Field of Classification Search
CPC ... G02B 6/4204; G02B 6/4226; G02B 6/4231
USPC .................... 385/14, 53, 92, 93, 88
See application file for complete search history.

(56) References Cited

U.S. PATENT DOCUMENTS

| 5,239,360 | A | * | 8/1993 | Moring et al. ................ 356/344 |
| 5,808,288 | A | * | 9/1998 | Gannon et al. ........... 235/472.01 |
| 6,071,017 | A | * | 6/2000 | Gilliland et al. ................ 385/93 |
| 2006/0002667 | A1 | | 1/2006 | Aronson |
| 2007/0081770 | A1 | | 4/2007 | Fisher |

FOREIGN PATENT DOCUMENTS

| KR | 10-2002-0020085 A | 3/2002 |
| KR | 10-2003-0055053 A | 7/2003 |

OTHER PUBLICATIONS

International Search Report relating to International Application No. PCT/US2011/025559 mailed Nov. 25, 2011.

* cited by examiner

*Primary Examiner* — Ryan Lepisto
*Assistant Examiner* — Erin Chiem
(74) *Attorney, Agent, or Firm* — Maschoff Brennan

(57) ABSTRACT

In one embodiment, an optical subassembly includes a housing, a ball lens, a constraining insert, and a ball lens constraint. The housing includes a fiber receptacle formed in a first end of the housing and a second receptacle formed in a second end of the housing opposite the first end. The fiber receptacle and second receptacle define a cavity through the housing from the first end to the second end of the housing. The ball lens and the constraining insert are disposed within the cavity. The ball lens constraint is configured to cooperate with the constraining insert to constrain the ball lens in three dimensions within the cavity.

9 Claims, 7 Drawing Sheets

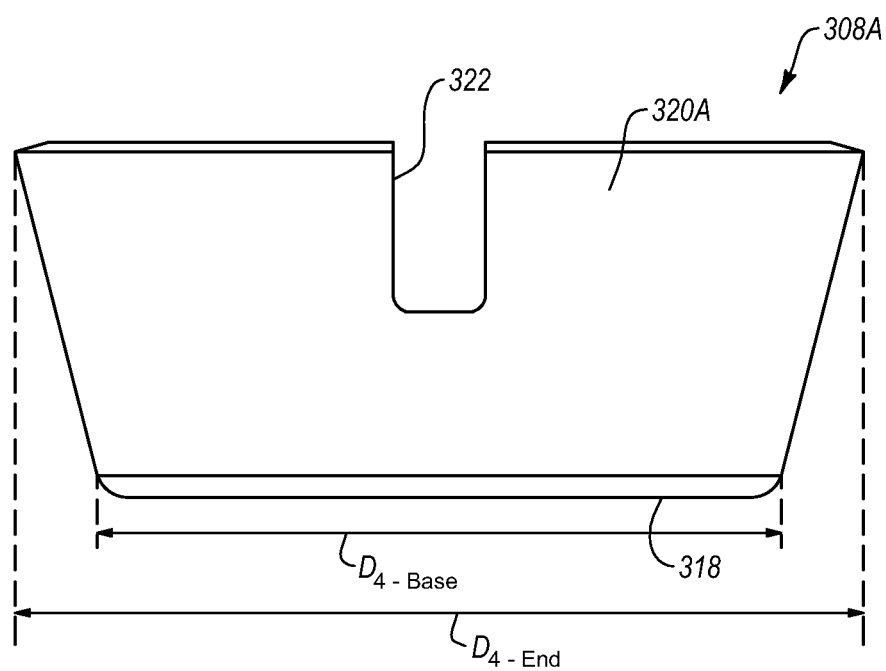
Fig. 3E
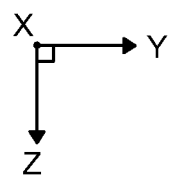

CONSTRAINING BALL LENS IN AN OPTICAL SUBASSEMBLY

BACKGROUND

1. Field of the Invention

Some embodiments relate to constraining a ball lens inside an optical subassembly ("OSA").

2. Related Technology

Optoelectronic modules, such as optoelectronic transceiver or transponder modules, are increasingly used in electronic and optoelectronic communication. Optoelectronic modules generally include one or more transmitters and/or receiver, as well as one or more printed circuit boards ("PCBs") with circuitry related to the transmitters/receivers, such as driving and amplifying circuitry. Electrical data signals generally pass through this circuitry as they pass between the transmitters/receivers and a host device in which the optoelectronic module is positioned.

Each of the transmitters is typically housed within a transmitter OSA ("TOSA"), while each of the receivers is typically housed within a receiver OSA ("ROSA"). Some TOSAs/ROSAs include a ball lens for collimating optical signals emitted/received by the transmitter/receiver. Conventional approaches for securing the ball lens within the TOSA/ROSA require adherence to tight manufacturing tolerances on the ball lens, the TOSA/ROSA housing and/or other components used to secure the ball lens within the TOSA/ROSA. Tight manufacturing tolerances tend to negatively impact, e.g., increase, the manufacturing cost of the components and the resulting TOSA/ROSA.

In addition, some conventional approaches for securing the ball lens within the TOSA/ROSA include the application of epoxy directly to the ball lens and/or include a single ring in contact with the ball lens. The direct application of epoxy can result in epoxy smudges on the ball lens that impair the performance of the TOSA/ROSA. The use of a single ring in contact with the ball lens stresses the ball lens at the contact ring. Epoxy smudges and stress on the ball lens can both negatively impact a TOSA/ROSA manufacturer's TOSA/ROSA yield and reliability.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

In general, example embodiments of the invention relate to constraining a ball lens inside an OSA.

In one example embodiment, an optical subassembly includes a housing, a ball lens, a constraining insert, and a ball lens constraint. The housing includes a fiber receptacle formed in a first end of the housing and a second receptacle formed in a second end of the housing opposite the first end. The fiber receptacle and second receptacle define a cavity through the housing from the first end to the second end of the housing. The ball lens and the constraining insert are disposed within the cavity. The ball lens constraint is configured to cooperate with the constraining insert to constrain the ball lens in three dimensions within the cavity.

In another example embodiment, an optical subassembly includes a housing, a ball lens, and a constraining insert. The housing includes a fiber receptacle formed in a first end of the housing and a second receptacle formed in a second end of the housing opposite the first end. The fiber receptacle and second receptacle define a cavity through the housing. A ball lens constraint is integrally formed in the housing at an intersection of the fiber receptacle with the second receptacle. The ball lens constraint defines a substantially circular aperture having a first diameter. The ball lens has a second diameter that is larger than the first diameter. The ball lens is disposed mostly within the second receptacle with a portion of the ball lens extending through the substantially circular aperture into the fiber receptacle. The constraining insert is disposed within the second receptacle. The constraining insert includes one or more resilient elements configured to bias the ball lens against the ball lens constraint.

These and other aspects of example embodiments will become more fully apparent from the following description and appended claims.

BRIEF DESCRIPTION OF THE DRAWINGS

To further clarify various aspects of some embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3E is a side view of an example ball lens constraint that can be implemented in the OSA of FIGS. 3A-3D;

DETAILED DESCRIPTION

Figure 1:
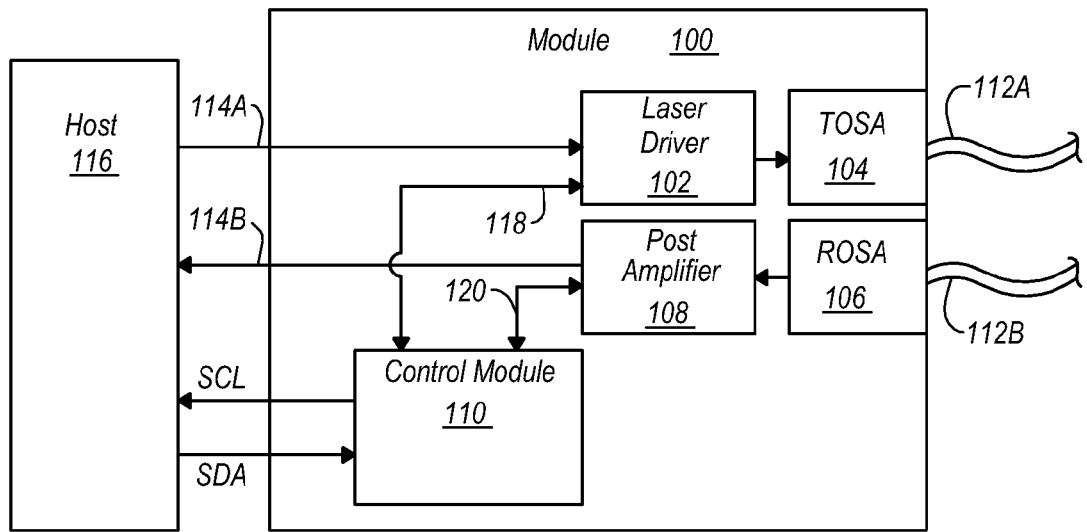
FIG. 1 illustrates an example optoelectronic module including a TOSA and a ROSA.

Example embodiments of the invention relate to devices, systems and methods for constraining a ball lens inside an OSA. Some example embodiments include an OSA with at least two ball lens constraints for substantially confining a ball lens within the OSA in three dimensions. At least one of the ball lens constraints is a constraining insert. Additionally, at least one of the two ball lens constraints includes is compliant or resilient for biasing the ball lens against the other of the ball lens constraints.

In some embodiments, the at least two ball lens constraints constrain the ball lens from at least two opposing sides of the ball lens to reduce stress on the ball lens compared to some OSA configurations in which the ball lens is constrained using a single ring contact (hereinafter referred to as "single ring configurations"). Optionally, OSAs that implement some embodiments of the invention have higher manufacturing yield and better reliability than OSAs with a single ring configuration due to the reduced stress on the ball lens and securely locking the ball lens in the z-direction. Alternately or additionally, the use of at least two ball lens constraints according to some embodiments permits tolerances to be relaxed for the OSA and its components and reduces the number of assembly steps, both features tending to reduce the cost of manufacturing and assembling the OSA.

The embodiments described herein can be implemented in various operating environments, including, for example, in optoelectronic modules. As used herein, the term "optoelectronic module" includes modules having both optical and electrical components. Examples of optoelectronic modules include, but are not limited to, transponders, transceivers, transmitters, and/or receivers. Optoelectronic modules can be used, for instance, in telecommunications networks, local area networks, metro area networks, storage area networks, wide area networks, and the like and can be configured to conform with one or more standardized form factors or multi-source agreements ("MSAs"), such as the XENPAK, XPAK, SFF, SFP, SFP+, XFP, QSFP and CFP form factors, without restriction. It will be appreciated, however, that the electronic and optoelectronic modules need not comply with standardized form factor requirements and may have any size or configuration necessary according to a particular design. Alternately or additionally, the optoelectronic modules can be suitable for optical signal transmission and reception at a variety of per-second data rates. Furthermore, optoelectronic modules of other types and configurations, or having components that differ in some respects from those illustrated and described herein, can also benefit from the principles disclosed herein.

I. Example Operating Environment

Reference will now be made to the drawings wherein like structures will be provided with like reference designations. It should be understood that the drawings are diagrammatic and schematic representations of exemplary embodiments and, accordingly, are not limiting of the scope of the present invention, nor are the drawings necessarily drawn to scale.

Reference is first made to FIG. 1, which illustrates a simplified block diagram of an example optoelectronic module 100 (hereinafter "module 100") in which some embodiments can be implemented. The module 100 is a transceiver in some examples. As illustrated in FIG. 1, the module 100 includes a laser driver 102, a TOSA 104, a ROSA 106, a post amplifier 108 and a control module 110.

In some embodiments, the TOSA 104 includes a fiber receptacle for receiving optical fiber 112A, and an optical signal source such as a laser diode or LED. Alternately or additionally, the ROSA 106 includes a fiber receptacle for receiving optical fiber 112B, an optical receiver such as a photodiode, and a preamplifier circuit.

During operation, the module 100 is configured to receive a data-carrying electrical signal 114A from a host 116, which can be any computing system capable of communicating with the module 100, for transmission as an outbound data-carrying optical signal on optical fiber 112A. More particularly, the laser driver 102 receives the data-carrying electrical signal 114A and modulates the optical signal source within the TOSA 104 to emit a corresponding outbound data-carrying optical signal onto optical fiber 112A.

The module 100 is also configured to receive and convert an inbound data-carrying optical signal into a data carrying electrical signal 114B provided to the host 116. In more detail, the inbound data-carrying optical signal is received from the optical fiber 112B by the optical receiver within ROSA 106. The optical receiver within ROSA 106 converts the inbound data-carrying optical signal to a data-carrying electrical signal which is provided to post amplifier 108. The data-carrying electrical signal is amplified by post amplifier 108 and provided to the host 116 as data carrying electrical signal 114B.

The control module 110 receives information from the laser driver 102 and/or post amplifier 108 and/or adjusts settings on the laser driver 102 and/or post amplifier 108 to optimize dynamically varying performance of the module 100. Alternately or additionally, a host communication interface such as an I²C interface with serial data ("SDA") and serial clock ("SCL") lines is implemented to communicate with the host 116.

As will be explained in greater detail in the following section, one or both of the TOSA 104 or ROSA 106 implements at least two ball lens constraints to constrain a ball lens within the TOSA 104 and/or ROSA 106. It will be appreciated, with the benefit of the present disclosure, that TOSAs 104 and/or ROSAs 106 according to embodiments disclosed herein can be implemented in environments such as the module 100. Further, the module 100 is only one of many different environments in which TOSAs 104 and/or ROSAs 106 according to embodiments disclosed herein can be implemented.

II. Example Optical Subassembly

Figure 2:
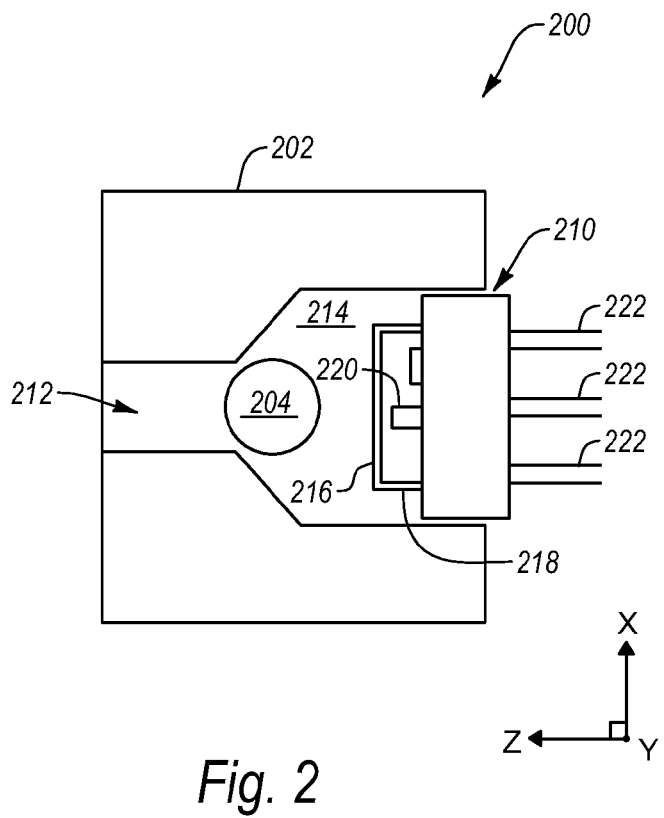
FIG. 2 depicts a simplified block diagram cross-section of an example OSA such as may be implemented as the TOSA or ROSA in the optoelectronic module of FIG. 1.

Reference is next made to FIG. 2, which illustrates a simplified block diagram cross-section of an example OSA 200. The OSA 200 may be implemented as, e.g., a TOSA 104 or a ROSA 106 in the module 100 or in other operating environments.

In the illustrated embodiment, the OSA 200 includes a housing 202, a ball lens 204, and a header assembly 210. Although not specifically identified in FIG. 2, the OSA 200 according to some embodiments further includes at least two ball lens constraints to substantially constrain the ball lens 204 in three dimensions within the housing 202. Various example ball lens constraints are disclosed with respect to FIGS. 3A-5C.

The housing 202 includes a fiber receptacle 212 formed in a first end of the housing 202. In a second end of the housing 202 opposite the first end, a second receptacle 214 is formed and is connected to the fiber receptacle 212. The fiber receptacle 212 and second receptacle 214 define a cavity through the housing 202 from the first end to the second end.

The ball lens 204 is disposed within the cavity defined by the fiber receptacle 212 and the second receptacle 214. Generally, the ball lens 204 is configured to collimate outbound data-carrying optical signals in the case of a TOSA, or inbound data-carrying optical signals in the case of a ROSA.

The header assembly 210 is at least partially received within the second receptacle 214. The header assembly 210 is a TO can in some embodiments, or other type of header assembly according to a determined form factor. If the OSA 200 is implemented as a TOSA, the header assembly 212 houses some of the electrical components and optical components employed to generate an optical signal from an electrical signal. If the OSA 200 is implemented as a ROSA, the header assembly 212 houses some of the electrical components and optical components employed to generate an electrical signal from an optical signal. In the illustrated embodiment, the header assembly 210 includes a window 216, a housing 218, an active optical component 220, and one or more leads 222.

Figure 3A:
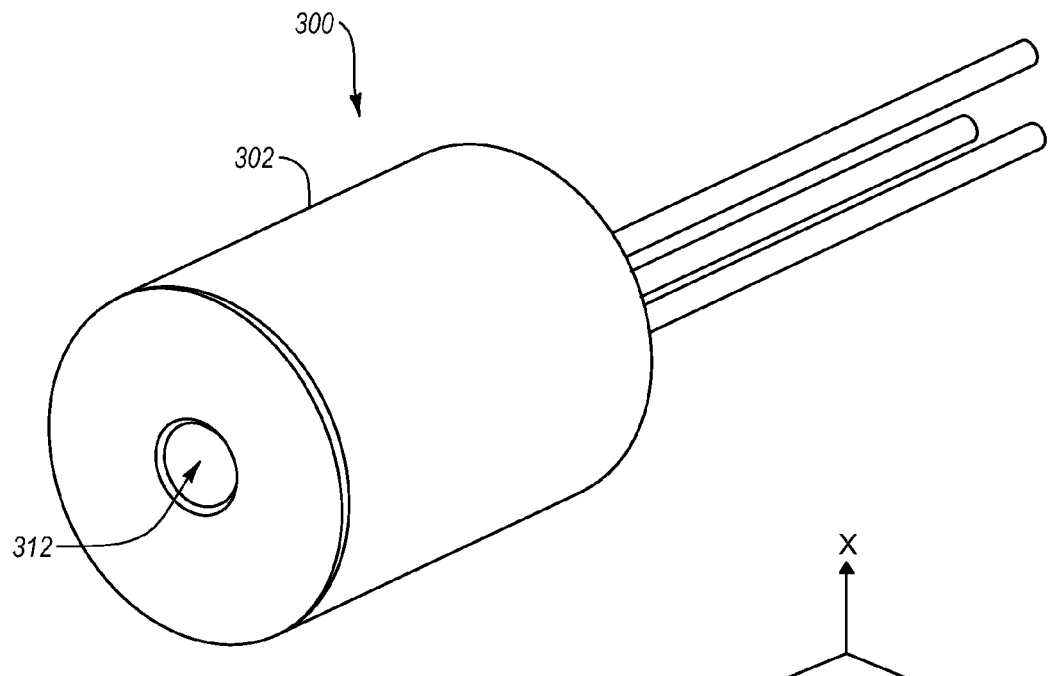
FIG. 3A is a perspective view of another example OSA such as may be implemented in the optoelectronic module of FIG. 1, the OSA having a housing and a header assembly.
Figure 3B:
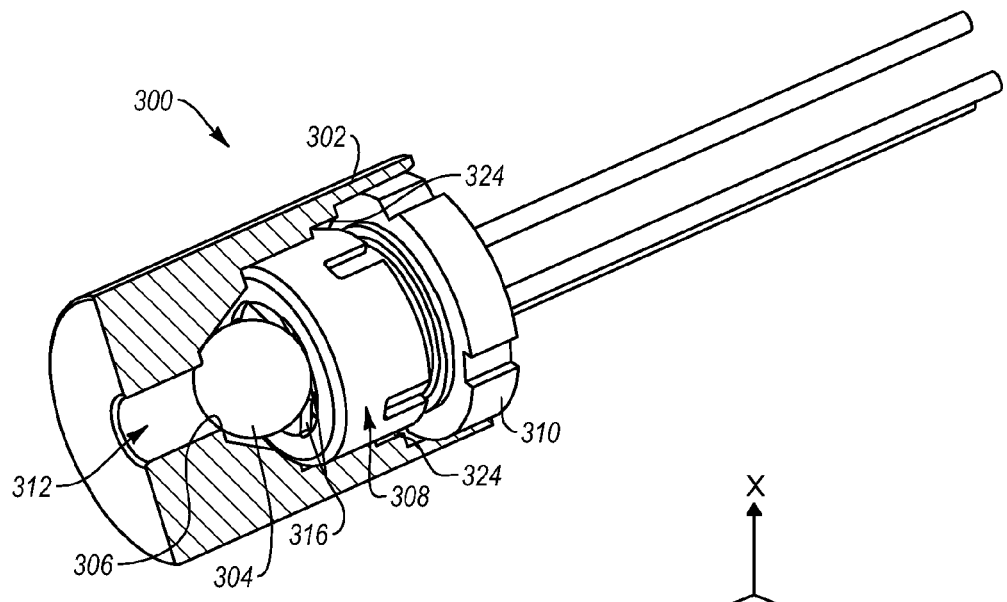
FIG. 3B is a perspective view of the OSA of FIG. 3A with a cross-sectional view through the housing.
Figure 3C:
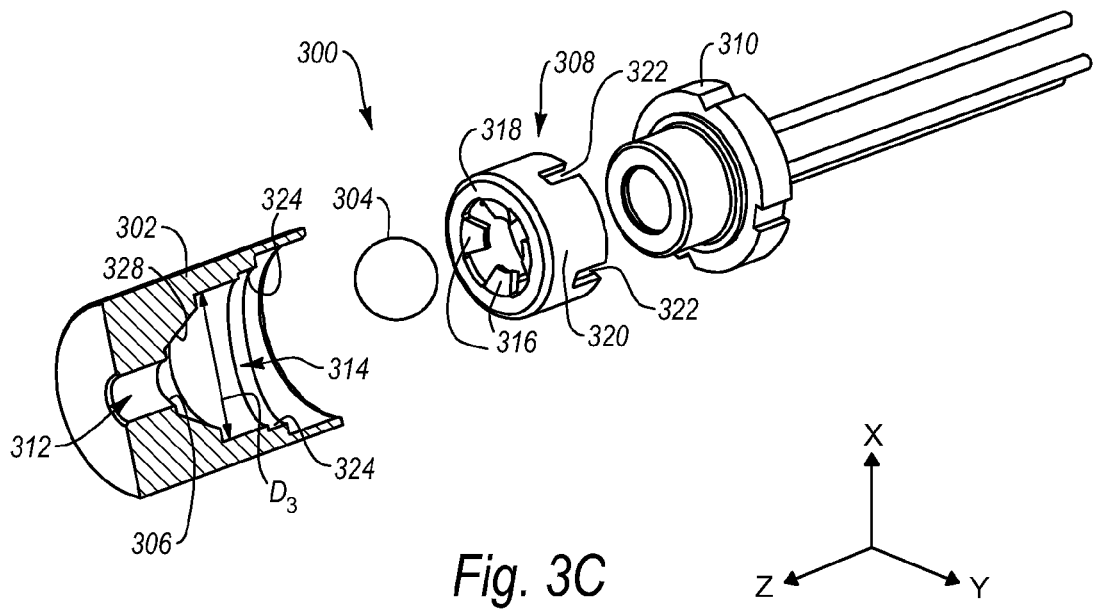
FIG. 3C is an exploded perspective view of the OSA of FIG. 3A with a cross-sectional view through the housing.

Another example OSA 300 including housing 302 is disclosed in FIGS. 3A-3D. FIG. 3A is a perspective view, FIG. 3B is a perspective view with a cross-section through the housing 302 and FIG. 3C is an exploded perspective view with a cross-section through the housing 302, of OSA 300.

As best seen in FIGS. 3B and 3C, the OSA 300 includes, in addition to housing 302, a ball lens 304, a first ball lens constraint 306 integrally formed in the housing 302, a second ball lens constraint 308 implemented as a constraining insert, and a header assembly 310.

Referring to FIG. 3C, the housing 302 includes a fiber receptacle 312 and a second receptacle 314 formed in opposite ends of the housing 302, the fiber receptacle 312 and second receptacle 314 collectively defining a cavity through the housing 302. The first ball lens constraint 306 is integrally formed in the housing 302 at the intersection of the fiber receptacle 312 with the second receptacle 314.

The first ball lens constraint 306 in some embodiments defines a frustoconical ring surface. As used herein, a frustoconical ring surface is the surface formed by truncating the tip of a cone by a plane parallel to the base of the cone, and includes the surface of the cone between the base of the cone and the plane parallel to the base of the cone exclusive of the base of the cone and the plane parallel to the base of the cone. A frustoconical ring surface has an axis and can be at least partially described in terms of the angle of intersection of the axis with a line that, if rotated about the axis, creates a cone surface that includes the frustoconical ring surface. This angle of intersection will be referred to herein as the "characteristic angle." In some embodiments, the frustoconical ring surface defined by the first ball lens constraint 306 is substantially coaxial with the fiber receptacle 312 and has a characteristic angle of about 32 degrees.

The ball lens 304 contacts the first ball lens constraint 306 at a plurality of locations that collectively form a generally circular ring, referred to herein as a "contact ring." In some embodiments, the frustoconical ring surface is substantially tangential to the surface of the ball lens 304 along the contact ring as measured by any line tangent to the ball lens 304 that intersects the axis of the frustoconical ring surface at the characteristic angle and that passes through the frustoconical ring surface. Such a configuration for the first ball lens constraint 306 exerts less stress on the ball lens 304 at the contact ring than a ball lens constraint having a sharp corner along the contact ring.

Although the characteristic angle of the frustoconical ring surface defined by the first ball lens constraint is 32 degrees in some embodiments, in other embodiments the characteristic angle may be more or less than 32 degrees depending on the average diameter of the frustoconical ring surface. More generally, the characteristic angle and average diameter can be selected such that the frustoconical ring surface is substantially tangential to the ball lens 304 at the contact ring.

Figure 3D:
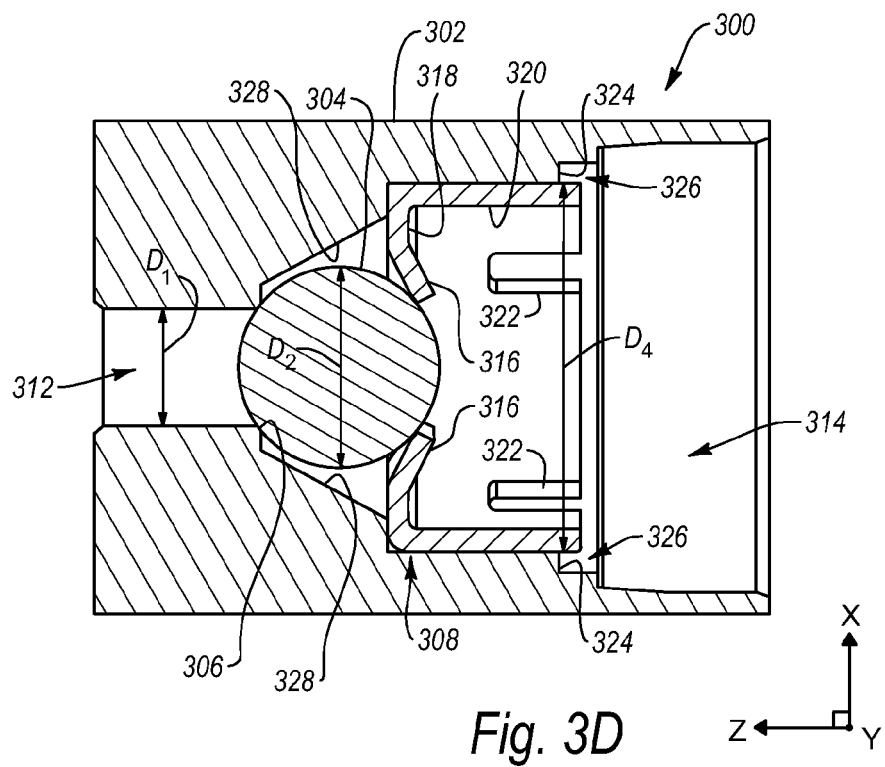
FIG. 3D is a cross-sectional side view of the OSA of FIG. 3A with the header assembly removed.

FIG. 3D is a cross-sectional side view of the OSA 300 without the header assembly 310. With reference to FIG. 3D, the first ball lens constraint 306 defines a substantially circular aperture having an inner diameter $D_1$. The ball lens 304 has an outer diameter $D_2$ that is larger than the inner diameter $D_1$. Most of the ball lens 304 is disposed within the second receptacle 314 (see FIG. 3C). However, the disparity in size between inner diameter $D_1$ and outer diameter $D_2$ and the generally spherical shape of ball lens 304 permits a portion of the ball lens 304 to extend into the fiber receptacle 312 in the illustrated embodiment.

In the example of FIGS. 3A-3D, the first ball lens constraint 306 is substantially rigid. In contrast, the second ball lens constraint 308 is at least partially compliant or resilient. For instance, the second ball lens constraint 308 in some embodiments includes one or more resilient elements that bias the ball lens 304 against the first ball lens constraint 306. More particularly, in the illustrated embodiment, the second ball lens constraint 308 includes a plurality of resilient fingers 316. The resilient fingers 316 are directed at least partially radially inward from a base 318 of the second ball lens constraint 308.

As best seen in FIGS. 3C-3D, the second ball lens constraint 308 further includes a substantially circular wall 320 extending from the base 318. Generally, the second ball lens constraint 308 is configured to be received within the second receptacle 314 in the area of the second receptacle 314 having an inner diameter $D_3$ (see FIG. 3C) to secure the ball lens 304 within the OSA 300. More particularly, the substantially circular wall 320 has an outer diameter $D_4$ approximately equal to the inner diameter $D_3$ such that the second ball lens constraint 308 can be press fit into the second receptacle 314 to secure the ball lens 304 within the OSA 300.

In this and other embodiments, the second ball lens constraint 308 is drawn from sheet metal or another suitable material, and, at least prior to assembling the second ball lens constraint 308 into an OSA 300, the substantially circular wall 308 diverges. In other words, at least prior to assembly, the outer diameter $D_4$ of the substantially circular wall 308 increases from the base 318 out to the end of the substantially circular wall 308.

For example, FIG. 3E illustrates an example of a second ball lens constraint 308A formed from drawn sheet metal and prior to assembly into the OSA 300. As illustrated, the second ball lens constraint 308A includes a base 318 and a substantially circular wall 320A that diverges from the base 318. The outer diameter near the base 318 is denoted "$D_{4-Base}$" and the outer diameter near the end of the substantially circular wall 320A is denoted "$D_{4-End}$." In the illustrated embodiment, the outer diameter $D_{4-Base}$ is noticeably smaller than the outer diameter $D_{4-End}$, hence the substantially circular wall 320A is said to diverge. Note that reference numbers 308A and 320A refer to the second ball lens constraint and substantially circular wall of FIG. 3E prior to assembly into the OSA 300, while reference numbers 308 and 320 refer to the second ball lens constraint and substantially circular wall of FIGS. 3B-3D after assembly into the OSA 300.

In some embodiments, the outer diameter $D_{4-Base}$ of substantially circular wall 320A is smaller than the inner diameter $D_3$ of the second receptacle 314, while the outer diameter $D_{4-End}$ is larger than the inner diameter $D_3$ of the second receptacle 314. In these and other examples, the divergence of the substantially circular wall 320A where the outer diameter $D_{4-Base}$ is smaller than the inner diameter $D_3$ of second receptacle 314, which in turn is smaller than outer diameter $D_{4-End}$, ensures a strong interference fit when the second ball lens constraint 308A is assembled into the second receptacle 314 of OSA 300.

By implementing the second ball lens constraint 308A with a substantially circular wall 320A that diverges prior to assembly, the inner diameter $D_3$ of second receptacle 314 within OSA 300 can be machined to a more relaxed tolerance than in other OSA designs that implement conventional ball lens holders. Moreover, the cost of a second ball lens constraint 308A made from drawn sheet metal according to some embodiments is less than the cost of a conventional ball lens holder having tight tolerance on its outer diameter.

One or more cutouts 322 are optionally formed in the substantially circular wall 320A. The cutouts 322 accommodate inward compression of the end of the substantially circular wall 320A by the second receptacle 314 when the second ball lens constraint 308 is inserted into the OSA 300. Thus, whereas the end of the substantially circular wall 320A may have an outer diameter $D_{4\text{-}End}$ that is larger than the inner diameter $D_3$ of the second receptacle 314 prior to assembly into the OSA 300, the cutouts 322 permit the end of the substantially circular wall 320A to flex inward during insertion into the OSA 300 without warping the base 318 or resilient fingers 316 to accommodate the smaller inner diameter $D_3$.

Returning to FIG. 3D, the resilient fingers 316 are configured to collectively exert a net force on the ball lens 304 that is directed at least partially in the positive z-direction against the stopping force provided by the first ball lens constraint 306. To this end, in some embodiments, the resilient fingers 316 are at least partially flexed in the negative z-direction by the ball lens when the second ball lens constraint 308 is completely assembled within the OSA 300. The resilient fingers 316 thereby bias the ball lens 304 against the first ball lens constraint 306. The resilient fingers 316 in some embodiments provide a gentle but firm hold on the ball lens 304.

Thus, the resilient fingers 316 bias the ball lens 304 in the positive z-direction against the first ball lens constraint 306 and the first ball lens constraint 306, being rigid, prevents the ball lens 304 from moving in the positive z-direction when the ball lens 304 is biased against the first ball lens constraint 306. Further, as already mentioned above, while most of the ball lens 304 is disposed within the second receptacle 314, a portion of the ball lens 304 extends past the first ball lens constraint 306 into the fiber receptacle 312. As such, the ball lens 304 cannot move in the x- or y-directions without also moving in the negative z-direction. However, the net force in the positive z-direction exerted by the resilient fingers 316 on the ball lens 304 is sufficient in most circumstances to prevent the ball lens 304 from moving in the negative z-direction. In some embodiments, the first and second ball lens constraints 306, 308 cooperate in the foregoing manner to substantially constrain the ball lens 304 within the OSA in three dimensions.

According to some embodiments, and as best seen in FIG. 3D, the second receptacle 314 includes a step 324 formed therein. The step 324 cooperates with the end of the substantially circular wall 320 of second ball lens constraint 308 to form a channel 326 that encircles the second ball lens constraint 308 near the end of the substantially circular wall 320. Optionally, the OSA 300 further includes epoxy or other adhesive disposed within the channel 326 to further secure the second ball lens constraint 308, and thus the ball lens 304, within the OSA 300.

Some ball lens constraining configurations involving the use of epoxy apply the epoxy directly to the ball lens. Direct application of epoxy to the ball lens often results in epoxy smudges on the ball lens that interfere with proper operation of the OSA. In contrast to ball lens constraining configurations involving direct application of epoxy to the ball lens, the configuration of FIGS. 3A-3D with the channel 326 permits epoxy to optionally be used in securing the ball lens 304 without directly applying the epoxy to the ball lens 304, thereby substantially reducing the likelihood of epoxy smudges on the ball lens 304.

According to some embodiments, the housing 302 includes a tapered region 328 where the second receptacle 314 tapers down to connect with the fiber receptacle 312. The tapered design of second receptacle 314 in tapered region 328 eliminates steps in the manufacturing process of the housing 302 by eliminating a boring step used in some OSA designs.

III. Alternative Embodiments

The example of FIGS. 3A-3D includes an OSA 300 having a first ball lens constraint 306 that is rigid and is integrally formed in the housing 302 and a second ball lens constraint 308 that is compliant or resilient and that includes a base 318 with a plurality of resilient fingers 316 and a substantially circular wall 320 extending thereof. The OSA 300 of FIGS. 3A-3D is provided by way of example only and numerous variations are contemplated that are within the scope of the invention and the appended claims. Such variations include OSAs with one rigid and one substantially compliant or resilient ball lens constraint as well as OSAs with two substantially compliant or resilient ball lens constraints.

Figure 4A:
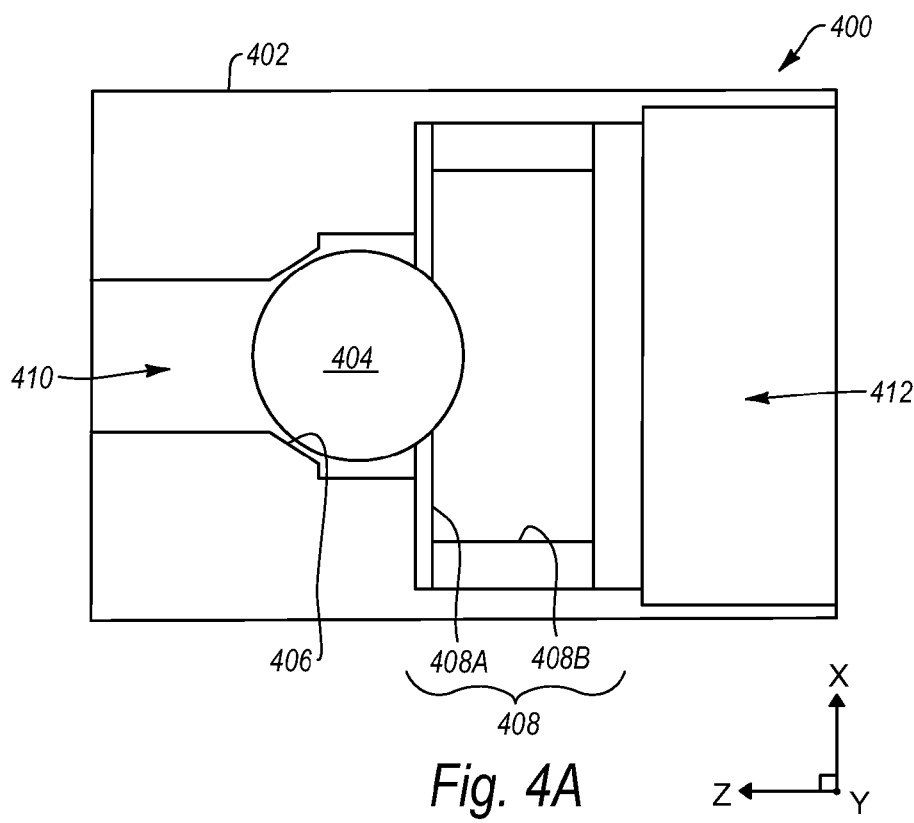
FIGS. 4A-4B illustrate two example OSAs such as may be implemented in the optoelectronic module of FIG. 1, each of the OSAs of FIGS. 4A-4B having one rigid ball lens constraint and one compliant or resilient ball lens constraint.

For instance, FIG. 4A illustrates an OSA 400 including a housing 402, a ball lens 404, a first ball lens constraint 406 that is rigid and a second ball lens constraint 408 that is compliant. Although not illustrated in FIG. 4A, the OSA 400 may further include a header assembly.

The housing 402 is generally similar to housing 302 of FIGS. 3A-3D and includes a fiber receptacle 410 and a second receptacle 412 collectively defining a cavity within which the ball lens 404 is disposed.

The first ball lens constraint 406 defines a frustoconical ring surface integrally formed inside the housing within the cavity and a substantially circular aperture having a diameter that is smaller than a diameter of the ball lens 404. The characteristic angle of the frustoconical ring surface is approximately 32 degrees in some embodiments. Alternately or additionally, the first ball lens constraint 406 is a ring integrally formed inside the housing 402 within the cavity.

The second ball lens constraint 408 is a constraining insert that includes a resilient element 408A. More specifically, the resilient element 408A is a compliant washer defining a substantially circular aperture having a diameter that is smaller than a diameter of the ball lens 404. The second ball lens constraint 408 further includes a sleeve 408B coupled to the resilient element 408A. The sleeve 408B is configured to secure the second ball lens constraint 408 within the second receptacle 412 via press fit.

In operation, the resilient element 408A is pressed against the ball lens 404 by the sleeve 408B. Further, the substantially resilient element 408A biases the ball lens 404 in the positive z-direction against the first ball lens constraint 406 to substantially constrain the ball lens 404 in the z-direction. Whereas portions of the ball lens 404 extend in the positive and negative z-directions through the apertures respectively defined by the first ball lens constraint 406 and the second ball lens constraint 408 and the resilient element 408A biases the ball lens 404 against the first ball lens constraint 406, the ball lens 404 is also substantially constrained in the x- and y-directions.

In some embodiments, the resilient element 408A and sleeve 408B are integral with each other. In other embodiments, the resilient element 408A and sleeve 408B are individual components. In embodiments that implement the resilient element 408A and sleeve 408B as individual components, deformation of the sleeve 408B during assembly of the second ball lens constraint into the OSA 400 is substantially decoupled from the resilient element 408A and the ball lens 404.

The resilient element 408A includes metal, plastic or other suitable materials. Alternately or additionally, the sleeve 408B includes metal or other suitable materials.

Optionally, the resilient element 408A is sufficiently compliant to absorb movement of the ball lens 404 caused by temperature changes and/or other impacts.

To ensure a tight interference fit of the sleeve 408B within the second receptacle 412, the sleeve 408B may be divergent at least prior to assembly into OSA 400, similar to the second ball lens constraint 308A of FIG. 3E prior to assembly into OSA 300. Alternately or additionally, the housing 402 may be tapered to lock in the sleeve 408B.

Figure 4B:
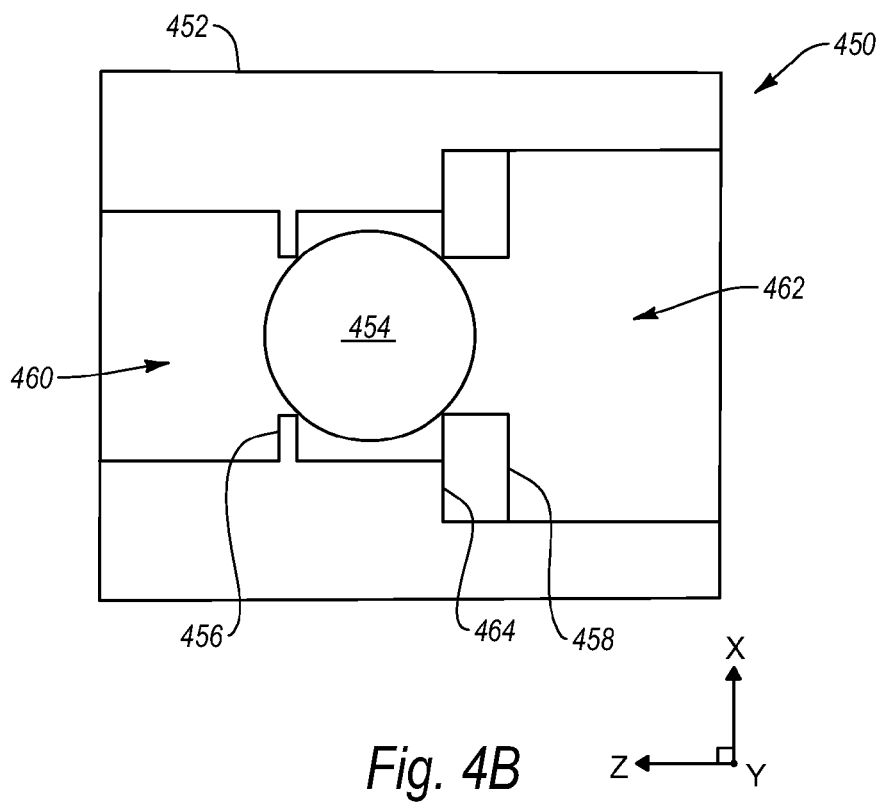

Turning to FIG. 4B, another example OSA 450 is disclosed according to some embodiments. The OSA 450 includes a housing 452, a ball lens 454, a first ball lens constraint 456 that is compliant and a second ball lens constraint 458 that is rigid. Although not illustrated in FIG. 4B, the OSA 450 may further include a header assembly.

The housing 452 includes a fiber receptacle 460 and a second receptacle 462 collectively defining a cavity within which the ball lens 454 is disposed. The housing 452 further includes a step 464 formed in the cavity.

The first ball lens constraint 456 is a compliant ring integrally formed with the housing 452 within the cavity collectively defined by the fiber receptacle 460 and the second receptacle 462. The first ball lens constraint 456 is spaced apart from the step 464.

The second ball lens constraint 458 is a constraining insert implemented as a press ring. The second ball lens constraint 458 is disposed adjacent to the step 464 which provides a hard stop for the second ball lens constraint 458 when assembling the second ball lens constraint 458 into the OSA 450. The first ball lens constraint 456 is configured to bias the ball lens 454 against the second ball lens constraint 458.

Figure 5A:
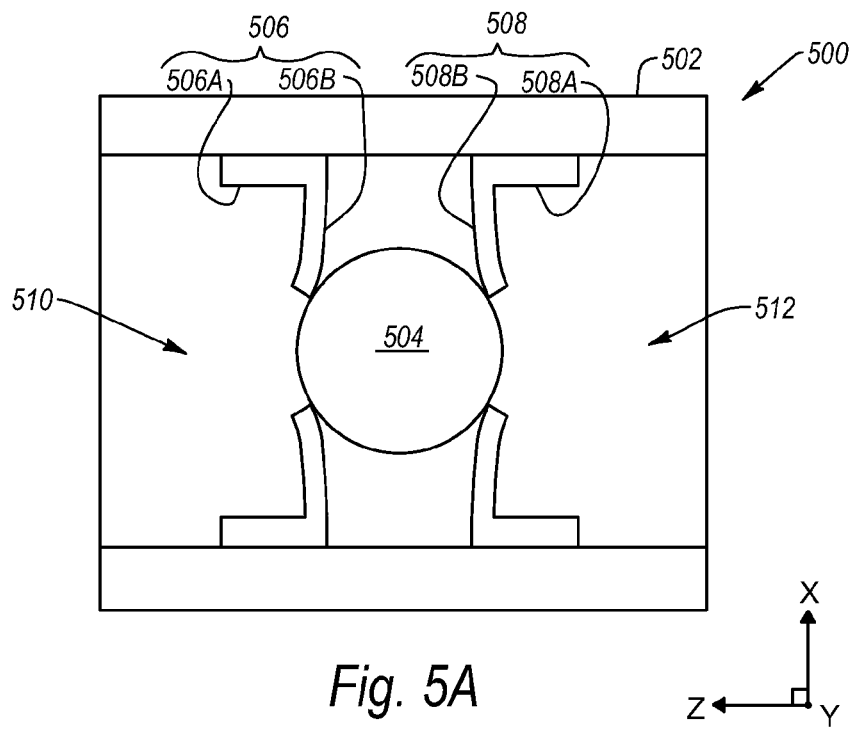
FIGS. 5A-5C illustrate three example OSAs such as may be implemented in the optoelectronic module of FIG. 1, each of the OSAs of FIGS. 5A-5C having two compliant or resilient ball lens constraints.
Figure 5B:
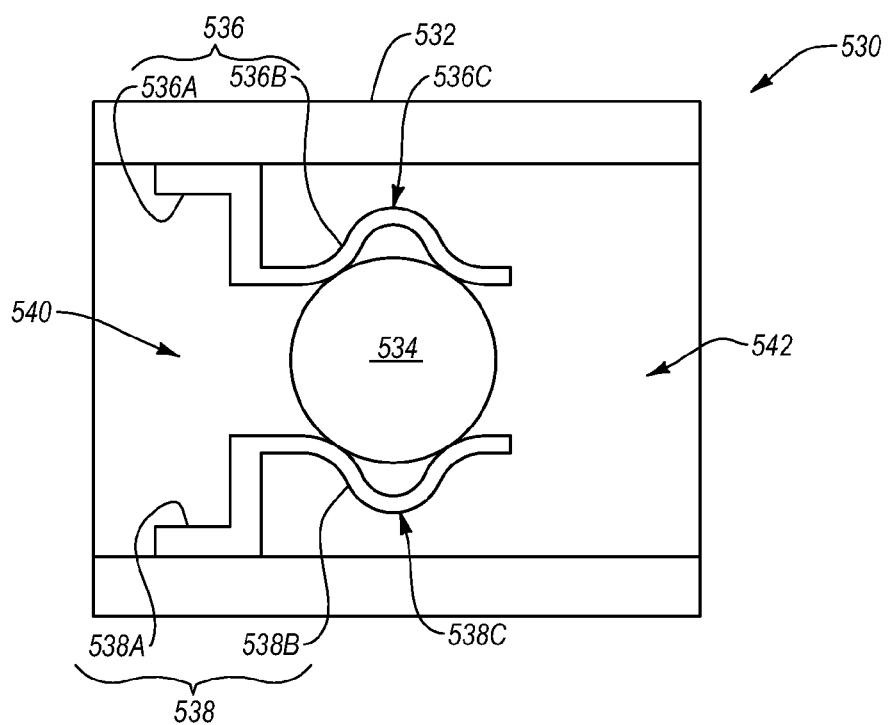
Figure 5C:
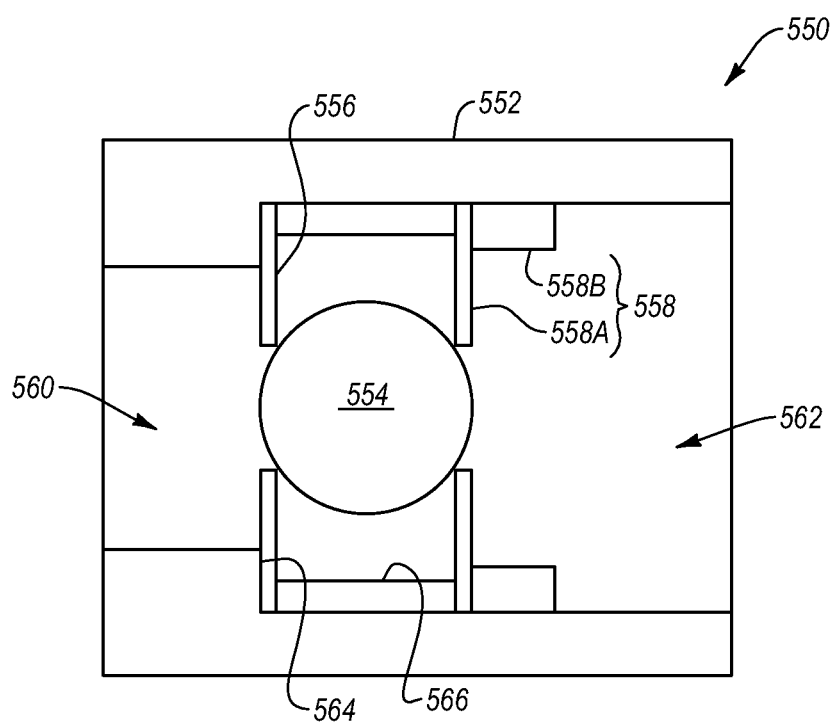
Figure 5C:
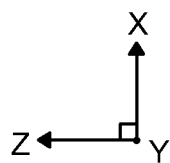

While FIGS. 3A-3D and 4A-4B depict OSAs 300, 400, 450 having one rigid ball lens constraint and one compliant or resilient ball lens constraint, other embodiments include OSAs having two compliant or resilient ball lens constraints as illustrated in FIGS. 5A-5C.

For example, FIG. 5A illustrates an OSA 500 including a housing 502, a ball lens 504, a first ball lens constraint 506 that is compliant or resilient and a second ball lens constraint 508 that is also compliant or resilient. Although not illustrated in FIG. 5A, the OSA 500 may further include a header assembly.

The housing 502 includes a fiber receptacle 510 and a second receptacle 512 collectively defining a cavity within which the ball lens 504 is disposed.

Both of the first and second ball lens constraints 506, 508 are constraining inserts. Each of the first and second ball lens constraints 506, 508 includes a press ring 506A, 508A and a compliant washer 506B, 508B. Each of the first and second ball lens constraints 506, 508 is configured to bias the ball lens 504 against the other of the second and first ball lens constraints 508, 506.

Optionally, one or more steps may be formed within the cavity of the housing 502 to act as hard stops for the press rings 506A, 508A during assembly of the first and second ball lens constraints 506, 508 into the OSA 500.

With additional reference to FIG. 5B, another example OSA 530 is illustrated. The OSA 530 includes a housing 532, a ball lens 534, a first ball lens constraint 536 that is compliant or resilient and a second ball lens constraint 538 that is also compliant or resilient. Although not illustrated in FIG. 5B, the OSA 530 may further include a header assembly.

The housing 532 includes a fiber receptacle 540 and a second receptacle 542 collectively defining a cavity within which the ball lens 534 is disposed.

Both of the first and second ball lens constraints 536, 538 are constraining inserts. Each of the first and second ball lens constraints 536, 538 includes a base 536A, 538A and one or more compliant arms 536B, 538B. The base 536A, 538A of each of the first and second ball lens constraints 536, 538 is secured to at least a portion of an inner diameter of the cavity collectively defined by the fiber receptacle 540 and second receptacle 542. The arms 536B, 538B extend at least partially radially inward from the bases 536A, 538A.

The arms 536B, 538B are configured to bias the ball lens 534 against each other. In particular, in the illustrated embodiment, the arm 538B biases the ball lens 534 in the positive x-direction against the arm 536B. Similarly, the arm 536B biases the ball lens 534 in the negative x-direction against the arm 538B. In some embodiments, each of the first and second ball lens constraints 536, 538 wraps at least partially around the interior of the housing 532 to also constraint the ball lens 534 in the y-direction. Alternately or additionally, the OSA 530 may include three or more ball lens constraints. In the example of three ball lens constraints, the ball lens constraints may be spaced at about 120 degrees apart from each other around the interior of the housing 532 to constrain the ball lens 534 in the x- and y-directions.

Additionally, each arm 536B, 538B includes a recessed elbow area 536C, 538C that collectively cooperate to substantially constrain the ball lens 534 in the z-direction. In particular, the ball lens 534 is seated within the elbow areas 536C, 538C and, due to the shape of the arms 536B, 538B, the ball lens 534 cannot move in the z-direction out of the elbow areas 536C, 538C without the arms 536B, 538B moving radially outward.

Optionally, one or more steps may be formed within the cavity of the housing 532 to act as hard stops for the base 536A, 538A of each of the first and second ball lens constraints 536, 538 during assembly of the first and second ball lens constraints 536, 538 into the OSA 530.

With additional reference to FIG. 5C, yet another example OSA 550 is illustrated. The OSA 550 includes a housing 552, a ball lens 554, a first ball lens constraint 556 that is compliant or resilient and a second ball lens constraint 558 that is also compliant or resilient. Although not illustrated in FIG. 5C, the OSA 550 may further include a header assembly.

The housing 552 includes a fiber receptacle 560 and a second receptacle 562 collectively defining a cavity within which the ball lens 554 is disposed. The housing 552 further includes a step 564 formed in the cavity.

Both of the first and second ball lens constraints 556, 558 are constraining inserts. The first ball lens constraint 556 is a first compliant washer defining a substantially circular aperture. The first ball lens constraint 556 is disposed adjacent to the step 564, which acts as a hard stop during assembly of the first ball lens constraint 556 into the OSA 550.

The second ball lens constraint 558 is spaced apart from the first ball lens constraint 556 by a spacer sleeve 566. The second ball lens constraint 558 includes a second compliant washer 558A and a press ring 558B. The second compliant washer 558A defines a substantially circular aperture. The press ring 558B secures the second compliant washer 558A, spacer sleeve 566 and first ball lens constraint 556 within the cavity in the housing 552 against the step 564.

After assembly, the ball lens 554 partially extends in the negative and positive z-directions, respectively, through the apertures defined by the first ball lens constraint 556 and the second ball lens constraint 558 such that the ball lens 554 is substantially constrained in the x- and y-directions. Further, the first and second ball lens constraints 556, 558 bias the ball lens 554 against each other, thereby substantially constraining the ball lens 554 in the z-direction.

Aspects of some of the embodiments disclosed herein can be combined and are not mutually exclusive. For instance, one or more of the OSAs 400, 450, 500, 530, 550 can have a step formed within the housing 402, 452, 502, 532, 552 that cooperates with one or more of the ball lens constraints 408, 458, 506, 508, 536, 538, 558 to form a channel to receive epoxy. Alternately or additionally, the components of one or more of the ball lens constraints 408, 506, 508, 536, 538, 558 can be formed integrally with each other or as separate components. Other combinations and/or variations are contemplated within the scope of the present invention.

Some embodiments described herein constrain a ball lens within a housing from a minimum of two opposing sides of the ball lens using a minimum of two ball lens constraints. The use of at least two ball lens constraints from two opposing sides of the ball lens reduces stress on the ball lens compared to some ball lens constraining configurations, e.g., single ring configurations. As a result, some embodiments facilitate higher OSA assembly yield and reliability due to the reduced stress on the ball lens.

Alternately or additionally, some embodiments described herein permit tolerances to be relaxed on one or more of the ball lens diameter, housing inner diameter, and ball lens constraint inner or outer diameter. Moreover, relaxed tolerances result in reduced manufacturing costs in some examples. Some embodiments further include fewer assembly steps than in OSAs with other ball lens constraining configurations.

According to some embodiments, one or both of the ball lens constrains implemented in the OSA is compliant or resilient. In these and other embodiments, the compliant or resilient ball lens constraint acts to a certain extent as a shock absorber for the ball lens.

Some embodiments disclosed herein are suitable for constraining a substantially spherical ball lens within an OSA. Alternately or additionally, the principles of the present invention apply to constraining non-spherical ball lenses within OSAs. Thus, the example substantially spherical ball lenses 204, 304, 404, 454, 504, 534, 554 of FIGS. 2-3D and 4A-5C should not be construed to limit the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical subassembly, comprising:
a housing including:
  a fiber receptacle formed in a first end of the housing;
  a second receptacle formed in a second end of the housing opposite the first end, the fiber receptacle and the second receptacle defining a cavity through the housing from the first end to the second end of the housing;
a ball lens disposed within the cavity;
a constraining insert disposed within the cavity; and
a ball lens constraint configured to cooperate with the constraining insert to constrain the ball lens in three dimensions within the cavity,
wherein:
  the constraining insert includes at least one resilient element configured to bias the ball lens against the ball lens constraint;
  the at least one resilient element includes a first side configured to be in contact with the ball lens and a second side opposite the first side that is completely unobstructed and open to a void;
  the at least one resilient element of the constraining insert includes a compliant washer defining a substantially circular aperture with a diameter that is smaller than a diameter of the ball lens; and
  the constraining insert further includes a press ring or a sleeve connected to the compliant washer and configured to secure the constraining insert within the second receptacle.

2. The optical subassembly of claim 1, wherein the ball lens constraint is integrally formed inside the housing within the cavity and defines a frustoconical ring surface and an aperture having a first diameter that is smaller than a diameter of the ball lens.

3. The optical subassembly of claim 2, wherein the the at least one resilient element comprises a plurality of resilient fingers directed at least partially radially inward, the plurality of resilient fingers exerting a net force on the ball lens that is directed against the ball lens constraint.

4. The optical subassembly of claim 1, wherein the compliant washer comprises metal or plastic, the press ring or the sleeve comprises the sleeve, and the sleeve comprises metal.

5. The optical subassembly of claim 1, wherein the compliant washer and the press ring or the sleeve are integral with each other or the compliant washer and the press ring or the sleeve are individual components.

6. The optical subassembly of claim 1, wherein:
the constraining insert further includes a substantially circular wall including a base from which the at least one resilient element radially extends inward and an end opposite the base;
the second receptacle includes a step that cooperates with the end of the substantially circular wall of the constraining insert to form a channel encircling the constraining insert near the end of the substantially circular wall; and
the optical subassembly further includes an epoxy disposed within the channel.

7. The optical subassembly of claim 1, wherein:
the press ring or the sleeve comprises the press ring;
the ball lens constraint comprises a second constraining insert; and
the second constraining inserts comprises a second compliant washer and a second press ring.

8. The optical subassembly of claim 1, wherein:
a step is formed on the housing within the cavity;
the ball lens constraint comprises a second compliant washer disposed adjacent to the step;
the optical subassembly further comprises a spacer sleeve disposed adjacent to the second compliant washer;
the compliant washer of the constraining insert is spaced apart from the second compliant washer by the spacer sleeve; and
the press ring of the constraining insert is configured to secure the compliant washer of the constraining insert, the spacer sleeve, and the second compliant washer inside the cavity against the step.

9. An optical subassembly, comprising:
a housing including:
  a fiber receptacle formed in a first end of the housing;
  a second receptacle formed in a second end of the housing opposite the first end, the fiber receptacle and second receptacle defining a cavity through the housing from the first end to the second end of the housing;
a ball lens disposed within the cavity;
a constraining insert disposed within the cavity; and
a ball lens constraint configured to cooperate with the constraining insert to constrain the ball lens in three dimensions within the cavity,
wherein a step is formed on the housing within the cavity and the ball lens constraint is a first compliant washer disposed adjacent to the step, and wherein the constraining insert includes a second compliant washer spaced apart from the first compliant washer by a spacer sleeve, and a press ring configured to secure the second compliant washer, spacer sleeve and first compliant washer inside the cavity against the step.

* * * * *